United States Patent [19]

Kimura

[11] Patent Number: 4,805,667
[45] Date of Patent: Feb. 21, 1989

[54] FLOW CONTROL VALVE

[75] Inventor: Keiichi Kimura, Yao, Japan

[73] Assignee: Kimura Kohki Co., Ltd., Osaka, Japan

[21] Appl. No.: 65,868

[22] Filed: Jun. 24, 1987

[30] Foreign Application Priority Data

Mar. 4, 1987 [JP] Japan .............................. 62-31265[U]
Mar. 4, 1987 [JP] Japan .............................. 62-31266[U]

[51] Int. Cl.⁴ .......................................... F16K 47/02
[52] U.S. Cl. ............................ 137/630.14; 251/129.11
[58] Field of Search ........... 137/599.2, 630.14, 630.15; 251/129.11

[56] References Cited

U.S. PATENT DOCUMENTS

| 966,509 | 8/1910 | Wulf | 137/630.14 X |
| 1,534,877 | 4/1925 | Simmons | 137/630.14 X |
| 2,200,226 | 5/1940 | Larson | 137/630.14 X |
| 4,539,881 | 6/1986 | Yoshino | 251/129.11 X |

FOREIGN PATENT DOCUMENTS

| 671118 | 9/1963 | Canada | 137/630.14 |
| 557746 | 2/1957 | Italy | 137/630.15 |
| 346770 | 4/1931 | United Kingdom . |
| 513425 | 10/1939 | United Kingdom . |
| 772292 | 4/1957 | United Kingdom . |
| 1103778 | 2/1968 | United Kingdom . |
| 1188022 | 4/1970 | United Kingdom . |
| 1261059 | 1/1972 | United Kingdom . |
| 1403179 | 8/1975 | United Kingdom . |
| 2035515 | 6/1980 | United Kingdom . |
| 2072805 | 10/1981 | United Kingdom . |
| 2098703 | 11/1982 | United Kingdom . |

Primary Examiner—Martin P. Schwadron
Assistant Examiner—Stephen M. Hepperle
Attorney, Agent, or Firm—Stevens, Davis, Miller & Mosher

[57] ABSTRACT

A flow control valve, which supports a valve body movably to a valve shaft suported movably in a valve chamber, is provided at the valve shaft with flow grooves for allowing a fluid to flow therethrough even when the valve body operates for closing and a sealing member which closes the flow grooves when the valve shaft is further moved with respect to the valve body in condition of closing operation, thereby enabling a fluid passage to be open or closed in two steps.

2 Claims, 4 Drawing Sheets

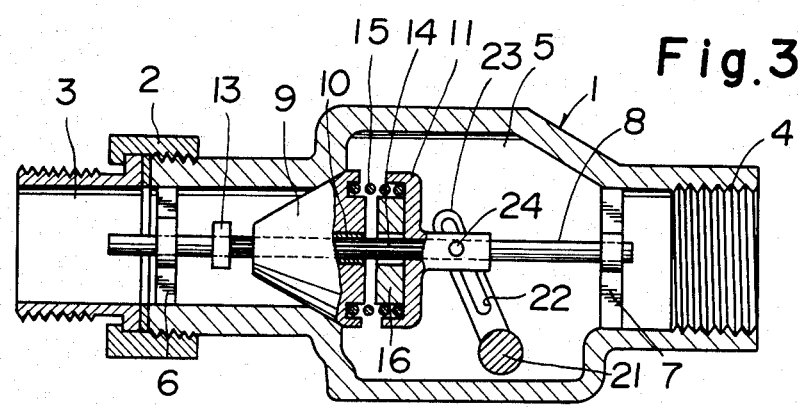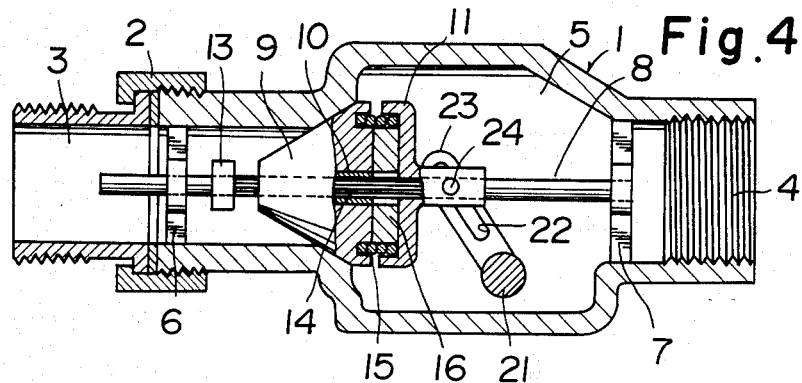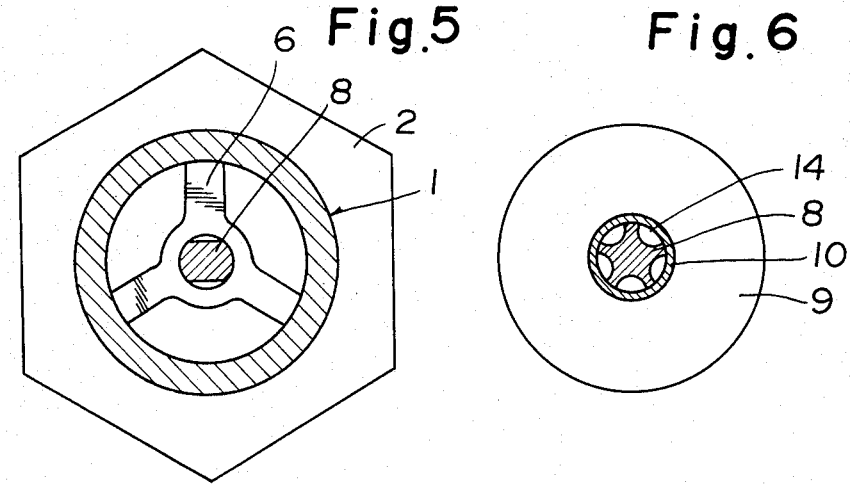

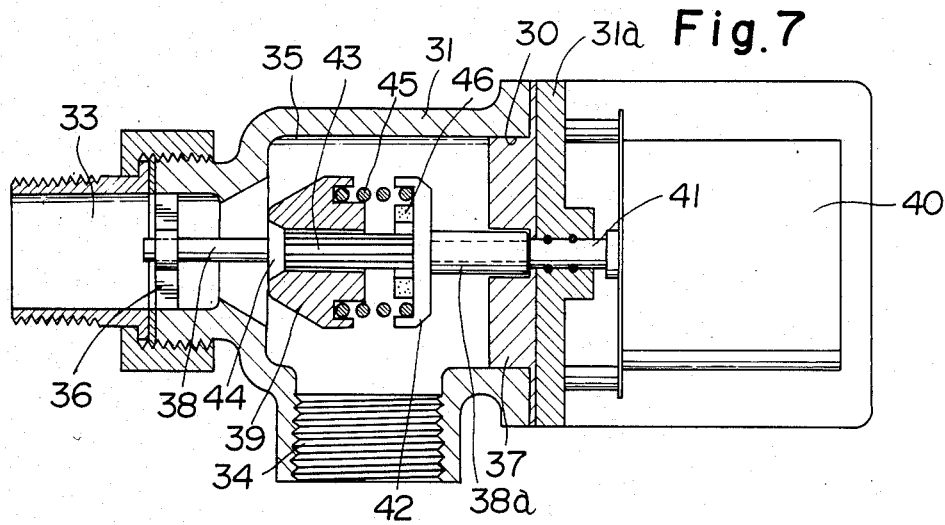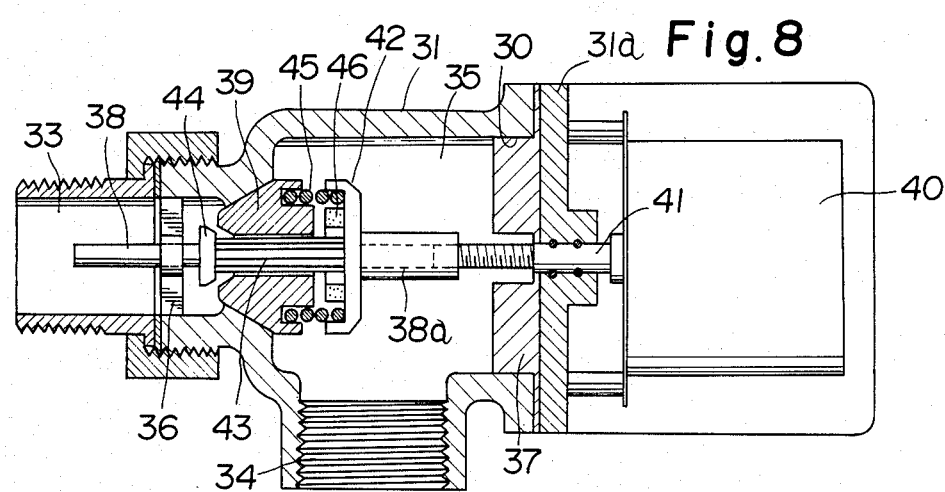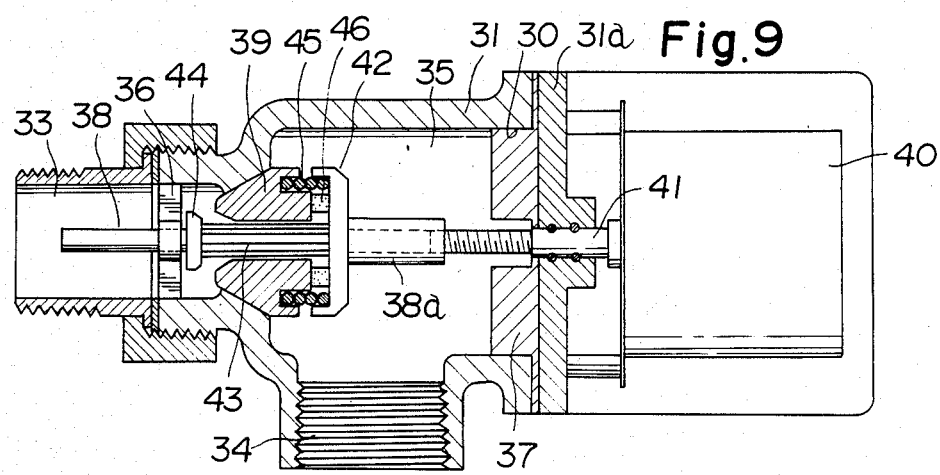

FLOW CONTROL VALVE

FIELD OF THE INVENTION

The present invention relates to a flow control valve, and more particularly to a flow control valve applied mainly to a cold and hot water piping connected to a fan coil unit at an air conditioner, thereby controlling a flow rate of the cold or hot water flowing in the fan coil unit.

BACKGROUND OF THE INVENTION

Conventionally, a flow control valve for controlling to cut off or allow a flow of a fluid, such as cold water or hot water, is well-known and so constructed that, for example, as shown in FIG. 10, a valve box 103 is provided with an inlet 100 and an outlet 101 for the fluid and houses in a valve chamber 104 a valve body 105 mounted on a driving shaft of a motor 106 and driven thereby to open or close the valve chamber 104 with respect to the inlet 100.

The flow control valve constructed as abovementioned actuates the valve body 105 by an open-close signal given to the motor 106 so as to open or close a passage for the fluid, in which the passage is abruptly open or closed on the basis of the open-close signal so that a flow of the fluid abruptly stops or starts to cause water hammering. As a result, the problem is created in that sounds or vibrations are generated.

SUMMARY OF THE INVENTION

A main object of the invention is to provide a flow control valve which can minimize generation of sounds or vibrations when the valve body is operated to open or close the passage.

Another object of the invention is to provide a flow control valve easy to maintain and inspect the valve body and accessories.

The present invention is characterized in that the valve body is operated to open or close the passage for the fluid at two steps. In detail, the flow control valve provided with a valve box having a valve chamber, a valve body housed therein, and a drive mechanism for operating the valve body, comprises; (a) a valve shaft supported movably to the valve chamber and provided with an interlocking unit interlocking with the drive mechanism, a valve holder for holding the valve body, a plurality of flow grooves formed at the outer periphery of the valve shaft, a valve support portion for axially movably supporting the valve body, and a stopper for restricting a moving range of the valve body; (b) a spring interposed between the valve body and the valve holder so as to bias the valve body toward the stopper, and allowing the fluid to flow into the valve chamber through the flow grooves; and (c) a sealing member which is interposed between the valve body and the valve holder, applies a gap with respect to the valve body positioned to close a passage between the valve box and the valve body so that the fluid flowing through the flow grooves is allowed to flow into the valve chamber through the gap and which closes the flow grooves when the valve shaft further axially moves with respect to the valve body in the closing position.

The flow control valve of the invention constructed as above-mentioned, when the valve body is operated to close the passage for the fluid, compensates a predetermined flow rate by the flow grooves provided at the valve shaft and thereafter the sealing member closes the flow grooves to completely cut off a flow of the fluid. In brief, the flow of the fluid can be cut off at the two steps.

Accordingly, even when the valve body is abruptly closed as conventional, generation of sounds or vibrations caused by the abrupt cut-off is restricted to a minimum.

Also, the inlet and outlet formed at the valve box may be disposed in alignment, but may alternatively be disposed at a right angle, an opening to open the valve chamber to the exterior may be provided in alignment with the inlet, a valve lid may be mounted detachably on the opening, and the drive mechanism for the valve body may be mounted on the valve lid. Hence, the valve lid is removed from the valve box to enable the valve body and valve shaft to be removed from the same, thereby facilitating maintenance and inspection for the valve body, spring and sealing member.

These and other objects of the invention will become more apparent in the detailed description and examples which follow.

BRIEF DESCRIPTION OF THE DRAWINGS

FIG. 3 is a longitudinal sectional plan view explanatory of the same when operated for closing a passage for a fluid in part, FIG. 4 is a longitudinal sectional plan view of the same when the passage is completely closed, FIG. 5 is a sectional view taken on the line V—V in FIG. 2, FIG. 6 is a sectional view taken on the line VI—VI in FIG. 2, in which a valve box is omitted, FIG. 7 is a longitudinal sectional front view of a second embodiment of the invention, FIG. 8 is an illustration of the valve body when operated for closing the passage in part, FIG. 9 is an illustration of the same when the passage is completely closed.

DETAILED DESCRIPTION OF THE INVENTION

Figure 1:
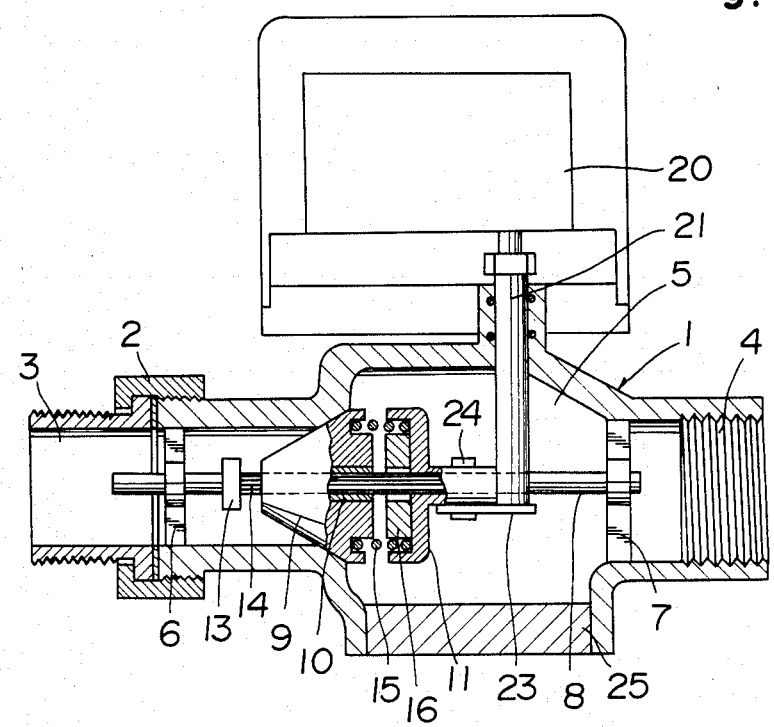
FIG. 1 is a longitudinal sectional front view of a first embodiment of a flow control valve of the invention.

At first, explanation will be given on a first embodiment of a flow control valve of the invention shown in FIGS. 1 through 6.

A valve box 1 in the first embodiment is lengthwise elongated and provided at one lengthwise side with an inlet 3 for connecting to inflow piping (not shown) and having a connector 2, at the other side with an outlet 4 disposed in alignment with the inlet 3, and between the inlet 3 and the outlet 4 with a valve chamber 5. Inside openings of the inlet 3 and outlet 4 at the valve box 1 are provided support members 6 and 7 each having a boss and three stays extending radially therefrom, so that a valve shaft 8 is supported axially movably to the support members 6 and 7.

The valve shaft 8 interlocks with a drive mechanism to be discussed below and is provided at an intermediate portion with a valve holder 11 to hold a valve body 9 movably supported to the valve shaft 8 and a stopper 13 to restrict a moving range of the valve body 9, and at the outer periphery of an intermediate shaft portion supporting the valve body 9 with flow grooves 14 for allowing the fluid to flow therethrough even when the valve body 9 is closed.

The valve body 9 is conical and inserts a sleeve 10 at the center and is provided at the outer periphery with a tapered seat surface opposite to a seat surface formed at the valve box 1 between the inlet 3 and the valve chamber 5. a fluid passage between both the seat surfaces is adjusted to enable flow control, and the seat surfaces in contact with each other can cut off a flow of the fluid between the seat surfaces. Between the valve body 9 and the valve holder 11 is interposed a spring 15 formed mainly of a coil spring, which biases the valve body 9 toward the stopper 13 to allow the fluid to flow into the valve chamber 5 through the flow grooves 14. At the surface of the valve holder 11 opposite to the valve body 9 is provided a sealing member 16 which forms a gap with respect to the valve body 9 when operated to close the fluid passage between both the seat surfaces so that the fluid flowing through the flow grooves 4 is allowed to flow into the valve chamber 5 through the gap and which closes the flow grooves 14 when the valve shaft 8 carrying the valve holder 11 further moves toward the inlet 3 with respect to the valve body 9 in condition of closing the fluid passage.

The sealing member 16 uses a packing formed mainly of rubber, which may alternatively use other materials.

The valve shaft 8 is moved by the drive mechanism 20 composed mainly of a motor. The drive mechanism 20 disposes a driving shaft 21 perpendicularly to the axis of valve shaft 8, the driving shaft 21 entering at the utmost end thereof into the valve chamber 5. A crank arm 23 having an elongate slot 22 is mounted on the utmost end of the driving shaft 21 entering into the valve chamber 5 and an interlocking pin 24 projecting from the valve shaft 8 is inserted into the elongate slot 22, so that the valve shaft 8 interlocks with the driving shaft 21.

Alternatively, such interlocking may use a cam mechanism, a screw mechanism or a mechanism using a rack and a pinion. Also, the drive mechanism may use oil pressure or an air cylinder.

Alternatively, one support member 6 may be fixed to the valve shaft 8 and moved together therewith. Alternatively, a support shaft fixed to the support member 6 and 7 may be provided so that the valve shaft 8 may be supported movably to the support shaft.

Next, explanation will be given on operation of the first embodiment of the invention constructed as above-mentioned.

Figure 2:
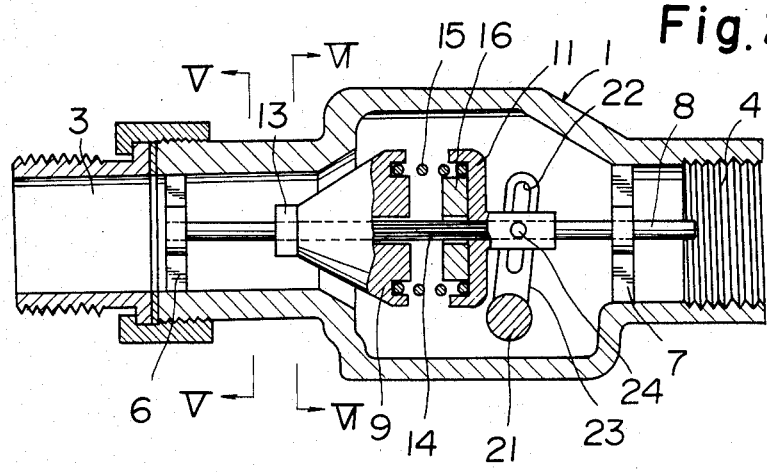
FIG. 2 is a longitudinal sectional plan view explanatory of operation of a valve body when fully open.
Figure 10:
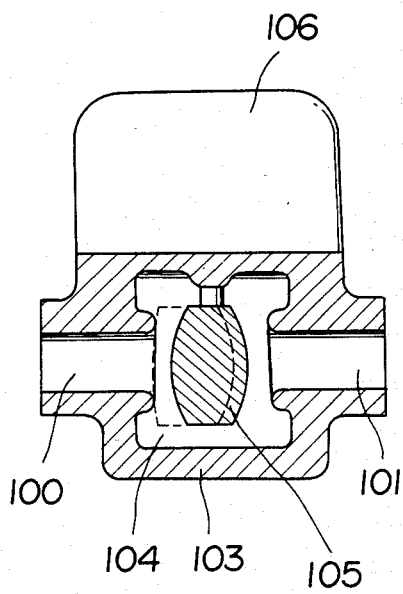
FIG. 10 is a schematic illustration of the conventional example.

At first, when the drive mechanism 20 is driven to move the valve shaft 8 rightwardly to a maximum as shown in FIG. 2, the valve body 9 moves away from the seat surface at the valve box 1 to a maximum, so that the inlet 3 is fully open with respect to the valve chamber 5.

When the valve shaft 8 is moved leftwardly from the above-mentioned condition, the valve body 9 moves leftwardly toward the seat surface at the valve box 1 through the spring 15, thereby adjusting the flow rate.

When this condition continues, the seat surface of the valve body 9 comes into contact with that of the valve box 1 so as to close the gap between both the seat surfaces, whereby the flow of fluid therethrough is cut off.

In such closing operation of the valve body 9, the gap between the sealing member 16 and the valve body 9 is left open, whereby a small quantity of the fluid flows from the inlet 3 to the valve chamber 5 through the flow grooves 14.

Therefore, even when the valve body 9 abruptly closes the passage of fluid, the fluid is not rapidly cut off, but its set flow rate is compensated by the fluid flowing through the flow grooves 14, thereby avoiding generation of sounds or vibrations caused by the water hammering.

After the above process, when the valve shaft 8 is further moved toward the inlet 3 with respect to the valve body 9 in condition of closing the gap between both the seat surfaces, the spring 15 is compressed and the sealing member 16 comes into contact with the oppsite surface of the valve body 9 to close the flow grooves 14, thereby closing the inlet 3 from the valve chamber 5 to completely cut off the fluid pasasge.

In addition, in FIG. 1, reference numeral 25 designates a lid to close an opening of the valve chamber 5 at the valve box 1, the lid 25 being detachably mounted thereto and adapted to be removed for carrying out the maintenance and inspection of the valve body 9, spring 15 and sealing member 16.

Next, explanation will be given on a second embodiment of the invention shown in FIGS. 7 through 9.

The second embodiment is so constructed that an inlet 33 and an outlet 34 at a valve box 31 are disposed perpendicularly to each other, a valve chamber 35 provided between the inlet 33 and the outlet 34 is open at an opening 30 formed in alignment with the inlet 33, a valve lid 31a is mounted detachably to the opening 30 through bolts (not shown), a drive mechanism 40 composed mainly of a motor is mounted on the valve lid 31a, and a driving shaft 41 at the drive mechanism 40 is disposed in aligment with a valve shaft 38 disposed in the valve chamber 35, thereby screwing with the valve shaft 38.

In greater detail, a support member 36 is provided inside an open end of the inlet 33 the same as in the first embodiment, a sealing member 37 is provided at the opening 30 at the valve body 31, the valve shaft 38 is supported at one end thereof axially movably relative to the support member 36, a tubular shaft 38a having an internal screw thread is formed at the other end of valve shaft 38, and the driving shaft 41 screws with the tubular shaft 38a so as to interlock therewith.

In addition, the valve shaft 38 is provided with a valve holder 42, flow grooves 43, and a stopper 44 for restricting a moving range of a valve body 39 supported to the valve shaft 38, and between the valve body 39 and the valve holder 42 with a spring 45 and a sealing member 46 as the same as the first embodiment.

In the second embodiment, the drive mechanism 40 is driven to move the valve shaft 38 in axial reciprocation by thrust of the screw thread at the driving shaft 41, whereby the valve body 39 and flow grooves 43 are open or closed the same as in the first embodiment.

Also, in the second embodiment, the valve lid 31a is removed from the valve box 31 to enable the drive mechanism 40, valve shaft 38 screwing with the driving shaft 41, valve body 39, spring 45, and sealing member 46 to be simultaneously taken out. Hence, the maintenance and internal inspection of the valve box 31 can be carried out through the opening 30 with ease, and the valve body 39 and other elements removed from the valve box 31 are easy to perform the maintenance and inspection and also assembly thereafter.

Alternatively, the valve bodies 9 and 39 in the aforesaid embodiments may be plate-like-shaped or of any other shape.

The flow control valve of the invention is applied mainly to pipings for cold or hot water at a fan oil unit in an air conditioner, in which the drive mechanisms 20 and 40 are preferable to be drivingly controlled on the basis of the detection result by a room temperature sensor for detecting an indoor temperature, thereby enabling the flow rate adjustment as well as on-off of the passage. In this case, the conic valve body at each embodiment is used to enable further fine flow rate adjustment.

Although several embodiments have been described, they are merely exemplary of the invention and not to be constructed as limiting, the invention being defined solely by the appended claims.

What is claimed is:

1. A flow control valve comprising:
   a valve box having a valve chamber, a valve body housed in said valve chamber, and a drive mechanism for operating said valve body,
   a valve shaft supported axially movably relative to said valve chamber and driven by said drive mechanism, a valve holder for holding said valve body, a plurality of flow grooves formed at the outer periphery of said valve shaft, a valve support portion for axially movably supporting said valve body, and a stopper for restricting a moving range of said valve body, said flow grooves being formed at an intermediate portion of said valve shaft, said valve holder and said stopper being disposed on said intermediate portion of said valve shaft at opposite ends of said flow grooves, said valve body being slidably supported on said valve shaft between said valve holder and said stopper, whereby fluid can flow in said flow grooves between said valve body and said valve shaft,
   a support member which is supported on said valve box and which supports one end of said valve shaft such that said valve shaft can slide freely relative to said support member in an axial direction, said valve shaft having at its other end a tubular shaft having a screw thread on its internal surface,
   a spring interposed between said valve body and said valve holder so as to bias said valve body toward said stopper and allow a fluid flowing through said flow grooves to flow into said valve chamber, and
   a sealing member which has an annular shape and is interposed between said valve body and said valve holder and, when said valve body is operated for closing, applies a gap with respect to said valve body, said gap allowing said fluid flowing through said flow grooves to flow into said valve chamber and which closes said flow grooves by further moving said valve shaft with respect to said valve body in the position of closing operation, wherein said valve box is provided with an inlet and an outlet for said fluid, said outlet communicating with said valve chamber perpendicularly with respect to said inlet, said driving mechanism being disposed in alignment with and opposite to said inlet, said driving mechanism including a motor having a driving shaft disposed in alignment with said valve shaft and in screw thread engagement with said valve shaft in said valve chamber, and wherein said valve box is provided with an opening through which said valve chamber is open in alignment with said inlet and a valve lid mounted detachably to said opening to close said opening, said motor being mounted on said valve lid said driving shaft having one end which passes through said valve lid and projects into said valve chamber and which screwably engages with said screw thread on said tubular shaft, said valve shaft and said valve body being made removable from said valve box through said opening.

2. A flow control valve according to claim 1, wherein said valve box and said valve body are provided with tapered seat surfaces respectively.

* * * * *